United States Patent
Tashiro et al.

(10) Patent No.: US 11,316,155 B2
(45) Date of Patent: Apr. 26, 2022

(54) CATHODE ACTIVE MATERIAL PRECURSOR FOR NON-AQUEOUS ELECTROLYTE SECONDARY BATTERY

(71) Applicant: SUMITOMO METAL MINING CO., LTD., Tokyo (JP)

(72) Inventors: Kenji Tashiro, Niihama (JP); Masanori Takagi, Niihama (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 174 days.

(21) Appl. No.: 16/473,339

(22) PCT Filed: Dec. 25, 2017

(86) PCT No.: PCT/JP2017/046491
§ 371 (c)(1),
(2) Date: Jun. 25, 2019

(87) PCT Pub. No.: WO2018/123995
PCT Pub. Date: Jul. 5, 2018

(65) Prior Publication Data
US 2020/0127286 A1    Apr. 23, 2020

(30) Foreign Application Priority Data

Dec. 26, 2016  (JP) .............................. JP2016-252080

(51) Int. Cl.
*H01M 4/485* (2010.01)
*H01M 4/505* (2010.01)
*H01M 10/0525* (2010.01)

(52) U.S. Cl.
CPC ........... *H01M 4/485* (2013.01); *H01M 4/505* (2013.01); *H01M 10/0525* (2013.01)

(58) Field of Classification Search
CPC combination set(s) only.
See application file for complete search history.

(56) References Cited

U.S. PATENT DOCUMENTS

2010/0068624 A1* 3/2010 Hiratsuka .............. C01G 53/42
429/223
2011/0300470 A1   12/2011 Olbrich et al.
2017/0133677 A1   5/2017 Ryoshi et al.

FOREIGN PATENT DOCUMENTS

| DE | 102006015538 | 10/2007 |
|---|---|---|
| EP | 1241721 | 9/2002 |
| JP | 2011-181193 | 9/2011 |
| JP | 2012-119093 | 6/2012 |
| JP | 2015-183083 | 10/2015 |
| JP | 2016-011225 | 1/2016 |
| JP | 2016-219278 | 12/2016 |
| JP | 2017-191707 | 10/2017 |

OTHER PUBLICATIONS

International Search Report dated Feb. 20, 2018 with respect to PCT/JP2017/046491.

* cited by examiner

*Primary Examiner* — Stewart A Fraser
*Assistant Examiner* — Claire L Roe
(74) *Attorney, Agent, or Firm* — IPUSA, PLLC

(57) ABSTRACT

There is provided a cathode active material precursor for a non-aqueous electrolyte secondary battery that is a complex metal hydroxide with a flow factor of 10 or greater to 20 or smaller.

4 Claims, 2 Drawing Sheets

CATHODE ACTIVE MATERIAL PRECURSOR FOR NON-AQUEOUS ELECTROLYTE SECONDARY BATTERY

TECHNICAL FIELD

The present invention relates to a cathode active material precursor for non-aqueous electrolyte secondary battery.

RELATED ART

In recent years, with the popularization of portable electronic devices such as mobile phones and notebook personal computers, there has been a demand for the development of small and lightweight secondary batteries with high energy densities. It is also required to develop high-output secondary batteries as batteries for electric vehicles such as hybrid vehicles. Lithium-ion secondary batteries are non-aqueous electrolyte secondary batteries that meet these requirements.

Lithium-ion secondary batteries are composed of an anode, a cathode, electrolyte, etc., and active materials of the anode and the cathode are made of materials capable of de-inserting and inserting lithium.

Lithium-ion secondary batteries using lithium complex oxides, especially lithium cobalt complex oxides, which are relatively easy to synthesize, as a cathode material, are expected to provide high voltages of 4V, and are expected to be batteries having a high energy density and are being put into practical use. In batteries using lithium cobalt complex oxides, numerous developments have been made to obtain excellent initial capacity and cycling characteristics, and various results have already been obtained.

However, the raw material of lithium cobalt complex oxides includes a cobalt compound, which is expensive. Therefore, the unit price per capacity of a battery using this lithium cobalt complex oxide is significantly higher than that of nickel hydrogen batteries, and the applicable applications of the battery using this lithium cobalt complex oxide are fairly limited.

For this reason, it is greatly expected, in small rechargeable batteries for portable devices and large rechargeable batteries for power storage and electric vehicles, to reduce the cost of the cathode materials so as to enable the production of cheaper lithium-ion secondary batteries. The realization of this is of great industrial significance.

New materials for Lithium-ion secondary batteries include lithium-nickel complex oxides using nickel, which is cheaper than cobalt. Since this lithium nickel complex oxide exhibits a lower electrochemical potential than lithium cobalt complex oxide, decomposition by oxidation of the electrolyte is difficult, and higher capacity may be expected, and as with the cobalt system, it exhibits a higher battery voltage. Therefore, development is being actively carried out.

A lithium-ion secondary battery manufactured using a lithium-nickel complex oxide synthesized purely from only nickel as the cathode material has a cycle characteristic inferior to that of batteries using cobalt. Further, the lithium-ion secondary battery has the disadvantage that it relatively tends to lose a cell performance due to use and storage in a high temperature environment. Thus, lithium-nickel complex oxides in which a portion of the nickel is substituted with cobalt or aluminum are generally known.

Various methods have been proposed for the manufacture of the cathode active materials for non-aqueous electrolyte secondary batteries, such as the lithium cobalt complex oxides and the lithium nickel complex oxides. For example, there is proposed the method for manufacturing the cathode active material for the non-aqueous electrolyte secondary battery including mixing the cathode active material precursor for the non-aqueous electrolyte secondary battery such as a nickel complex oxide and the lithium compound, and firing the resulting mixture.

For example, Patent Document 1 discloses a method for manufacturing a cathode active material for a non-aqueous electrolyte secondary battery including a crystallization process of adding an alkaline solution to an aqueous mixture of Ni salt and M salt to co-precipitate Ni and M hydroxide, filtering, washing with water, drying the resulting precipitate to yield nickel complex hydroxide: $Ni_xM_{1-x}(OH)_2$, a firing process of mixing the resulting nickel complex hydroxide: $Ni_xM_{1-x}(OH)_2$ with a lithium compound so that the molar ratio of Li to the sum of Ni and M, namely Li/(Ni+M), is 1.00 to 1.15, firing the mixture at a temperature of 700° C. or higher and 1000° C. or lower to obtain the lithium nickel complex oxide, and a water washing process in which the resulting lithium nickel complex oxide is washed by water.

Further, in Patent Document 1, after the crystallization process and prior to the firing process, there is a roasting process of roasting the nickel complex hydroxide: $Ni_xM_{1-x}(OH)_2$ obtained in the crystallization process at a temperature below 800° C. in an air atmosphere for one hour or greater to obtain a complex oxide.

RELATED ART DOCUMENT

Patent Document

[Patent Document 1] Japanese Patent Application Publication No. 2012-119093

Problem to be Solved by the Invention

However, when the cathode active material precursor for a non-aqueous electrolyte secondary battery and the lithium compound are weighed and mixed, even when the cathode active material precursor for a non-aqueous electrolyte secondary battery and the lithium compound are accurately measured, they may not be uniformly mixed or may be separated during mixing or firing. If both components are not uniformly mixed or are separated, the composition of the cathode active material for the non-aqueous electrolyte secondary batteries obtained after firing may vary. In the past, however, the state of mixtures of cathode active material precursors for non-aqueous electrolyte secondary batteries and lithium compounds has not been fully investigated.

Accordingly, in view of the problems of the background art, one aspect of the present invention is intended to provide a cathode active material precursor for a non-aqueous electrolyte secondary battery that is easy to mix with a lithium compound and can inhibit separation with the lithium compound.

Means for Solving Problems

According to one aspect of the present invention, in order to solve the above-described problems, provided is a cathode active material precursor for a non-aqueous electrolyte secondary battery that is a complex metal hydroxide having a flow factor of 10 or greater to 20 or smaller.

Effect of Invention

According to one aspect of the present invention, provided is the cathode active material precursor for the non-aqueous electrolyte secondary battery which is easy to mix with the lithium compound and can inhibit separation with the lithium compound.

MODES FOR CARRYING OUT THE INVENTION

Embodiments for carrying out the present invention will now be described with reference to the drawings. The present invention is not limited to the following embodiments, and various modifications and substitutions may be made to the following embodiments without departing from the scope of the present invention.
(Cathode Active Material Precursor for Non-Aqueous Electrolyte Secondary Battery)

First, an example of a configuration of a cathode active material precursor for a non-aqueous electrolyte secondary battery according to this embodiment will be described.

The cathode active material precursor for the non-aqueous electrolyte secondary battery (hereinafter simply referred to as "cathode active material precursor") of this embodiment is a composite metal hydroxide and can have a flow factor of 10 or greater to 20 or smaller.

The inventors of the present invention have studied extensively the causes of non-uniform mixing or separation of mixtures when a cathode active material precursor is mixed with a lithium compound.

As a result, we found that the powder characteristic of the cathode active precursor has a significant effect on the ease of mixing with the lithium compounds and on the inhibition of separation from the mixture.

The inventors of the present invention have further studied and have completed the invention by finding that a cathode active material precursor having appropriate fluidity, specifically a cathode active material precursor having a predetermined range of flow factors, may be easily and uniformly mixed when mixed with a lithium compound, and can inhibit separation.

Here, the flow factor means the ratio between the maximum consolidation stress obtained in the shear test and the single axis decay stress (maximum consolidation stress/ single axis decay stress). Flow factors may be measured and calculated using the "Method of Measuring Limit State Lines and Wall Fall Destruction Lines by Single-Side Shear Test" of JIS Z 8835 (2016) or the "Standard Test Method for Share Testing of Bulk Solids Using the Jenike Shear Test" of ASTM D6128.

Figure 1A:
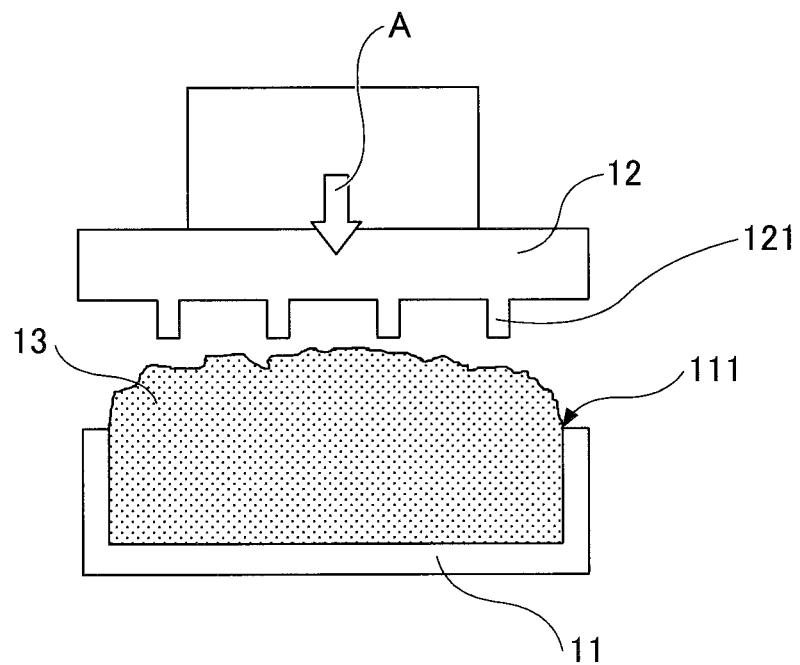
FIG. 1A explains a method for evaluating a flow factor in an embodiment of the present invention.
Figure 1B:
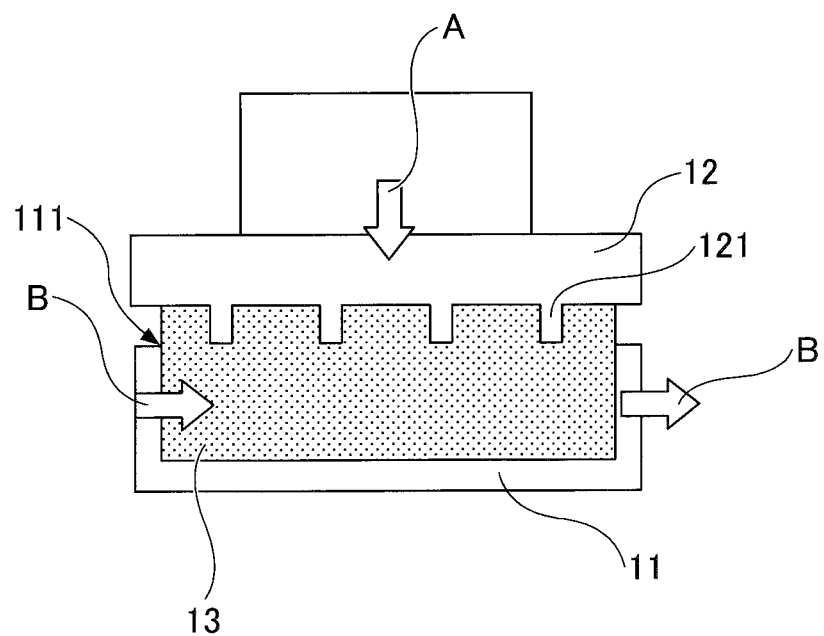
FIG. 1B explains the method for evaluating the flow factor in the embodiment of the present invention.

For example, measurement and calculation may be performed by the following procedure. FIGS. 1A and 1B are schematic cross-sectional views of the shear test of the flow factor evaluation device, parallel to the direction in which pressure is applied and passing through the sample chamber. Referring to FIGS. 1A and 1B, the same members are numbered and the description thereof is omitted.

As illustrated in FIG. 1A, a lower cell 11 having a sample chamber 111 and an upper cell 12 may be disposed on top of the lower cell 11 and may be moved relative to the lower cell 11 to shear powder samples in the lower cell 11. The surface facing the lower cell 11 of the upper cell 12 is provided with a convex portion 121 for applying a shear force to the powder sample in the sample chamber 111.

The sample chamber 111 is then filled with the cathode active material precursor 13, which is the evaluated sample, and the upper cell 12 is lowered along block arrow A, i.e., vertically, to press the cathode active material precursor 13 at arbitrary pressure. In this case, the stress becomes the maximum consolidation stress.

The uniaxial decay stress of the cathode active material precursor 13 is then measured by moving the lower cell 11 along block arrow B, i.e., horizontally, with the cathode active material precursor 13 pressed in a direction along block arrow A by the upper cell 12, as illustrated in FIG. 1B.

As described above, the maximum consolidation stress and the single axis decay stress may be measured to calculate the flow factor.

Since the flow factor indicates that the higher the numerical value of the powder, the higher the fluidity, it is preferable that the cathode active material precursor of this embodiment has a large flow factor, preferably at least 10, so that it may be easily uniformly mixed when mixed with a lithium compound.

However, it is preferable that the flow factor of the cathode active material precursor of the present embodiment be 20 or smaller because the mixture with the lithium compound may be separated if the flow factor is too high.

More preferably, the flow factor of the cathode active material precursor of this embodiment is, in particular, 12 or greater to 18 or smaller.

Further, it is preferable that the cathode active material precursor of the present embodiment have an internal friction angle of 30° or greater and 32° or smaller, and more preferably 30° or greater and 31° or smaller.

The internal friction angle is a parameter representing the friction between the constituent powders and the resistance of the mating in an angle, indicating the slippability of the powder. The internal friction angle may be measured, for example, by a commercially available powder layer shearing force measuring device.

The smaller the internal friction angle is, the easier the powder slides and the higher the fluidity becomes. Therefore, it is preferred that the cathode active material precursor of the present embodiment be 32° or smaller so as to facilitate uniform mixture when the cathode active material precursor is mixed with the lithium compound. However, it is preferred that the internal friction angle of the cathode active material precursor of the present embodiment be 30° or greater in order to particularly inhibit the separation possibly occurring in the mixture with the lithium compound if the flow rate becomes too high.

As long as the cathode active material precursor of this embodiment is mixed with a lithium compound and used in the manufacture of the cathode active material, the composition of the cathode active material precursor is not specifically limited.

However, as described above, the lithium nickel cobalt complex oxide is useful as the non-aqueous cathode active material, and the cathode active material precursor for producing the lithium nickel cobalt complex oxide is required. Therefore, it is preferred that the cathode active material precursor of the present embodiment include nickel and cobalt.

Further, the addition of additional elements other than lithium, nickel, and cobalt to the lithium nickel cobalt complex oxide has been studied to enhance the battery property.

Therefore, it is preferable that the cathode active material precursor of this embodiment also include M (M is at least one selected from Mg, Al, Ca, Ti, V, Cr, Mn, Zr, Nb, Mo, Sr, and W) as an additional element.

The cathode active material precursor of this embodiment is a complex metal hydroxide as described above and may be mixed with a lithium compound as described above to be used in the production of the cathode active material. The cathode active material precursor of this embodiment can also be roasted, partially or entirely as the complex metal oxide, mixed with the lithium compound, and used in the production of the cathode active material.

According to the investigation of the inventors of the present invention, when the cathode active material precursor of the present embodiment is roasted, and a part or all of the complex metal oxide is used as the complex metal oxide, the complex metal hydroxide before roasting has the flow factor described above, so that it is easy to mix the roasted product with the lithium compound, and thus the separation of the roasted product from the lithium compound may be prevented. This is probably because, even when roasted, there is no significant change in powder properties, i.e., the tendency of mixing with lithium compounds. Therefore, for example, when the cathode active material precursor of the present embodiment is easily mixed with the lithium compound and the separation of the lithium compound may be suppressed, the roasted object is similarly easily mixed with the lithium compound, and the separation of the roasted object from the lithium compound may be inhibited. Further, in the roasted object of the cathode active material precursor according to the present embodiment, it is easy to mix with the lithium compound, and when it is possible to inhibit separation of the lithium compound, the cathode active material precursor prior to roasting is also easily mixed with the lithium compound. Therefore, it may be said that it is possible to prevent separation of the lithium compound, and the separation of the roasted object from the lithium compound may be inhibited.

As described above, if the cathode active material precursor of the present embodiment satisfies the flow factors described above, the roasted object is also easily mixed with the lithium compound, and after mixing, the lithium compound may be inhibited from being separated. Therefore, when the cathode active material precursor of the present embodiment is roasted, the flow factor of the roasted object is not particularly limited, but it is preferable that the roasted object flow factor of the cathode active material precursor of the present embodiment be, for example, 8.0 or greater to 14.0 or smaller.

Further, the internal friction angle of the roasted object of the cathode active material precursor according to this embodiment is preferably 30° or greater and 32° or smaller, and more preferably 30° or greater and 31° or smaller.

Although an example of the configuration of the cathode active material precursor of the present embodiment has been described above, because the cathode active material precursor of the present embodiment has a predetermined flow factor, it is possible to easily mix with the lithium compound and inhibit the separation of the mixture. Accordingly, the cathode active material may be manufactured using the cathode active material precursor of the present embodiment to obtain the cathode active material having a uniform composition. Said differently, the cathode active material precursor of the present embodiment may be used to obtain, for example, a cathode active material that inhibits the dispersion of lithium when the mass ratio (a Li/Me ratio) of lithium to metal other than lithium is measured at multiple points.

(Method for Manufacturing Cathode Active Material Precursor)

The method for manufacturing the cathode active material precursor of this embodiment is not particularly limited, and may be prepared by any method so as to have the flow factors described above.

Here, an example of the configuration of the method for manufacturing the cathode active material precursor according to the present embodiment will be described.

The method for manufacturing the cathode active material precursor of this embodiment may include a crystallization process of performing an eutectic deposition of the contained metal such as nickel and cobalt and arbitrary element M.

An example of the configuration of the crystallization process will be described below.

In the crystallization process, while stirring the reaction solution, a mixed aqueous solution (a) (hereinafter simply referred to as "mixed aqueous solution (a)) containing a salt of a metal that constitutes the cathode active material precursor to the reaction solution and an aqueous solution (b) containing an ammonium ion supplier are supplied and a caustic alkali aqueous solution (c) is supplied so as to react, and particles of the crystallized cathode active material precursor are solidly separated, washed with water, and dried to obtain the cathode active material precursor.

When starting the crystallization process, an initial aqueous solution containing water, the aqueous solution (b) containing an ammonium ion supplier, and the caustic aqueous solution (c) may be prepared. Preferably, the initial aqueous solution is prepared by adding the aqueous solution (b) containing an ammonium supplier and the caustic aqueous alkaline solution (c) so that its ammonium ion concentration, pH value, and temperature are within a preferred range in a reaction solution described below. After the start of the crystallization process, the reaction solution is formed by adding a mixed aqueous solution (a), an aqueous solution containing an ammonium ion supplier (b), and a caustic aqueous alkaline solution (c) to the initial aqueous solution as described above.

The mixed aqueous solution (a) is the source of metal that constitutes the cathode active material precursor. For example, if the cathode active material precursor contains nickel and cobalt, it may contain a nickel salt and a cobalt salt. A metal salt of the additive element M may also be included as described above.

The aqueous solution (b) containing the ammonium ion supplier serves as a complex forming agent to control the particle size and shape of the particles of the resulting cathode active material precursor. Moreover, the ammonium ion is a preferred complexing agent for obtaining a high purity particle of the cathode active material precursor because they are not incorporated into the particle of the resulting cathode active material precursor.

The caustic aqueous alkaline solution (c) is a pH adjusting agent for the neutralization reaction.

The metal salt concentration of the metal salt including the cathode active material precursor in the mixed aqueous solution (a) is not specifically limited and is preferably 0.5 mol/L or greater and 2.2 mol/L or smaller. It is not preferable to be smaller than 0.5 mol/L because the volume of liquid in each process is too large and productivity is reduced. On the other hand, if the temperature exceeds 2.2 mol/L, the metal salt may recrystallize in the mixed aqueous solution (a) so as to clog the piping, etc.

In the crystallization process, the pH of the reaction solution is not particularly limited, but it is preferable that the pH of the reaction solution be maintained at, for example, 11.0 or greater to 13.0 or smaller on a 50° C. basis, and more preferably at 11.0 or greater to 12.5 or smaller. If the pH of the reaction solution is below 11.0, the initial nucleation in the reaction system is inhibited, the number of particles becomes too small. Therefore, the consumed amount of metal salts that constitute the cathode active material precursor by the growth of the particles becomes too small relative to the supplied amount of metal salt that constitutes the cathode active material precursor. Therefore, most of the metal salts that constitutes the cathode active material precursor is consumed for nucleation. As a result, abnormal nuclear development, called cycling phenomenon, may occur, whereby the particle size in the vessel shows little growth and large particle sizes may not be obtained. On the other hand, when the pH exceeds 13.0, a large number of nuclei are steadily produced, and the number of nuclei in the system increases so that a large grain size may not grow.

During the crystallization process, the temperature of the reaction solution is preferably kept at 20° C. or greater to 70° C. or smaller, and more preferably at 40° C. or greater to 70° C. or smaller. When the temperature of the reaction solution is lower than 20° C., fine particles are likely to be produced depending on the solubility of the metal that constitutes the cathode active material. Further, in order to eliminate the effects of seasonal fluctuations, it is undesirable from an industrial perspective because of the necessity to introduce chillers causing other equipment costs high. On the other hand, when the temperature exceeds 70° C., the volatility of ammonia becomes more intense, and control of the concentration of the ammonium ions in the reaction system may be difficult.

Furthermore, the concentration of the ammonium ion in the reaction solution is preferably maintained at 5 g/L or greater to 20 g/L or smaller during the crystallization process, and more preferably at 10 g/L or greater to 16 g/L or smaller. If the ammonium ion concentration is less than 5 g/L, fine particles are likely to be produced depending on the solubility of the metal constituting the cathode active material, and the particle size may be reduced. Further, even when the particle is grown, the metal salt including the cathode active material precursor is not supplied to the inside of the particles, and precipitation reaction occurs on the particle surface. Therefore, only low density hydroxide particles are obtained, and the cathode material obtained from the particles may also have a low density, resulting in a decrease in energy density per volume. On the other hand, when the ammonium ion concentration exceeds 20 g/L, it is undesirable because the concentration of a portion of the metal that constitutes the cathode active material remaining in the solution increases, resulting in the composition deviation.

Preferably, the metal salt of the metal constituting the cathode active material is at least one of sulfate, nitrate, or chloride, and more preferably, a non-halogen contaminated sulfate. For example, cobalt sulfate, nickel sulfate, and the like may be used.

Also, as described above, one or more elements selected from Mg, Al, Ca, Ti, V, Cr, Mn, Zr, Nb, Mo, Sr and W may be added to the cathode active material precursor as the additive element M. When the additive element M is added, it may be added as a compound of the additive element M in the mixed aqueous solution (a). The compound of the additive element M is not specifically limited. For example, magnesium sulfate, calcium nitrate, strontium nitrate, titanium sulfate, ammonium molybdenum, sodium tungstate, ammonium tungstate, and the like may be used as this compound.

Even when the compound of the additive element M is added in the mixed aqueous solution (a), it is preferable that the metal salt concentration of the mixed aqueous solution (a) be maintained under the conditions described above. The added amount of the element M is also adjusted to correspond to the atomic number ratio of the metal element in the desired cathode active material precursor, e.g., in the mixed aqueous solution (a).

The additive element M does not necessarily need to be added to the mixed aqueous solution (a) and co-precipitated. For example, the additive element M may be co-precipitated without adding the additive element M, and compounds such as hydroxides or oxides of the element M may be deposited on the surface of the resulting co-precipitate by the wet neutralization method. Further, when more than one type of M element is added, the desired cathode active material precursor may be obtained by combining the above addition methods.

In preparing the mixed aqueous solution (a), the metal salt is preferably adjusted so that the atomic number ratio of the metal ion present in the mixed aqueous solution is consistent with the atomic number ratio of the metal element in the desired cathode active material precursor.

The aqueous solution (b) including the ammonium ion supplier is preferably, but not limited to, an aqueous solution of ammonia water, ammonium sulfate or ammonium chloride, and more preferably, an aqueous solution of ammonia and ammonium sulfate without contamination by halogen. Further, the concentration of the ammonium ion supplier is not particularly limited, and the concentration of the ammonium ion in each process may be adjusted to a sustainable range.

The caustic aqueous alkali solution (c) is not particularly limited, and an aqueous solution of an alkali metal hydroxide such as, for example, sodium hydroxide or potassium hydroxide may be used. In the case of an alkali metal hydroxide, it is preferable to add it to the reaction system of each process as an aqueous solution due to the ease of pH value control.

Although it is not specifically limited in the crystallization process, preferably, the caustic alkaline aqueous solution (c) is reacted while maintaining the reaction solution at a predetermined pH by continuously supplying the mixed aqueous solution (a) and the aqueous solution (b) containing the ammonium ion supplier, respectively, by adjusting the added amount, and that the reaction solution containing the precursor particles is continuously overflowed from the reaction vessel to recover the cathode active material precursor.

The reaction vessel used in the crystallization process is preferably, but is not specifically limited to, a container including a stirrer, an overflow port, and a temperature control means.

In order to obtain the cathode active material precursor having a predetermined flow factor, it is preferable, for example, in the crystallization process, to perform crystallization while applying the sufficient stirring force to the reaction solution according to the feed rate of the mixed aqueous solution (a), etc.

In the crystallization process, a suitable range of the stirring force applied to the reaction solution varies depending on the feed rate of the mixing aqueous solution (a), the conditions of the reaction vessel, or the like. For this reason, it is preferred that a preliminary test be performed to select the suitable stirring force and perform the crystallization process in relation to the flow factor of the resulting cathode active material precursor and the crystallization condition and the added stirring force.

After completing the crystallization process, the resulting complex metal hydroxide, which is the cathode active material precursor, may be used as a raw material for the cathode active material.

Further, the complex metal hydroxide, which is the cathode active material precursor, may be roasted, and some or all of the complex metal oxide may be used as the raw material of the cathode active material. In this manner, when the complex metal hydroxide that is the cathode active material precursor is roasted, the roasting process of roasting the complex metal hydroxide that is the cathode active material precursor obtained in the crystallization process may be further performed after the crystallization process in the method for manufacturing the cathode active material precursor according to the present embodiment.

The conditions for roasting the complex metal hydroxide that is the cathode active material precursor obtained in the crystallization process are not particularly limited. Rather, roasting conditions may be selected according to the degree of conversion to the required oxide.

In the roasting process, for example, a complex metal hydroxide, which is the cathode active material precursor obtained by the crystallization process, may be fired at 500° C. or higher to 700° C. or lower.

In the roasting process, the atmosphere when roasting the complex metal hydroxide, which is the cathode active material precursor, is not particularly limited, and it is preferably carried out in an air flow that may be easily carried out, although it may be in a non-reducing atmosphere.

The equipment used for roasting is not particularly limited, and it is preferable that the complex metal hydroxide, which is the cathode active material precursor, may be heated in a non-reducing atmosphere, preferably in an air flow, and an electric furnace, which is free of gas generation, or the like is preferably used.

Incidentally, the roasting process may be performed, for example, before the mixing process, in the method for manufacturing the cathode active material described later.

[Method for Manufacturing Cathode Active Material]

The method for manufacturing the cathode active material in this embodiment is not particularly limited. The method for manufacturing the cathode active material in this embodiment can have, for example, the following processes.

A mixing process of preparing a mixture of the above cathode active material precursor and a lithium compound; and a firing process of firing the mixture.

Each process will be described below.

(Mixing Process)

In the mixing process, a mixture (mixed powder) may be obtained by mixing the cathode active material precursor with a lithium compound.

The ratio of the cathode active material precursor to the lithium compound is not particularly limited and may be selected depending on the composition of the cathode active material being produced.

Since Li/Me varies little before and after the firing process described below, the Li/Me in the mixture to be subjected to the firing process is approximately the same as the Li/Me in the resulting cathode active material. Therefore, it is preferable to mix the Li/Me in the mixture prepared in the mixing process so that it is the same as Li/Me in the cathode active material to be obtained.

For example, in the mixing process, it is preferable to mix so that the ratio (Li/Me) of the number of atoms (Li) of a metal other than lithium in the mixture to the number of atoms (Li) of lithium is 1.00 or greater and 1.08 or smaller. In particular, it is more preferable to mix so that the ratio of the number of lithium atoms in the mixture to the number of non-lithium metal atoms (Li/Me) is between 1.025 or higher and 1.045 or lower.

One or greater selected from, for example, lithium hydroxide, lithium carbonate, and the like can preferably be used as the lithium compound used for the mixing process. Further, the particle size of the lithium compound is preferably 50 µm or greater to 100 µm or smaller in D50 (a median diameter based on volume). The lithium compound used in the mixing process may be subjected to a milling process, sieving, or the like to adjust the particle size before being fed to the mixing process.

In the mixing process, a common mixer may be used as the mixing means for mixing the cathode active material precursor with the lithium compound, for example, a shaker mixer, a RADIGE mixer, a Julia mixer, a V blender, and the like.

As described above, the roasting process may be performed in advance, and the mixing process may be a process of preparing a mixture of a compound of a complex metal hydroxide and a lithium compound, in which part or all of the complex metal hydroxide is the complex metal oxide.

Accordingly, the mixing process can also be a process of preparing the mixture of lithium compounds with one or more selected from the complex metal oxides that are the aforementioned cathode active material precursors and the aforementioned cathode active material precursors roasted.

As described above, when the complex metal oxide is used in part or all of the complex metal hydroxide as one of the raw materials of the mixing process, in the firing process described later, the mixture of the complex metal oxide and the lithium compound may be fired with part or all of the complex metal hydroxide as the complex metal oxide.

(Firing Process)

The firing process is a process in which the mixture obtained in the above mixing process is fired to form the cathode active material. When the mixture is fired during the firing process, lithium in the lithium compound diffuses into the cathode active material precursor, forming the cathode active material.

In the firing process, the firing temperature of the mixture is not particularly limited, but is preferably, for example, between 600° C. and 950° C., and more preferably between 700° C. and 900° C.

By setting the firing temperature to 600° C. or higher, lithium diffusion into the cathode active material precursor can proceed sufficiently and the resulting crystal structure of the cathode active material may be uniform. Therefore, it is preferable to use the product as the cathode active material because the battery property may be particularly enhanced. Further, the reaction can proceed sufficiently to prevent residual lithium and unreacted particles from remaining.

By setting the firing temperature to 950° C. or smaller, it is possible to prevent the sintering from proceeding between the particles of the produced cathode active material. Further, it is possible to inhibit the generation of abnormal grain growth and to prevent the resulting particles of the cathode active material from coarsening.

In the process of heating to the firing temperature, it is possible to keep the temperature of the lithium compound at a temperature near the melting point for 1 hour or longer and 5 hours or shorter, so that the reaction may be performed more uniformly, which is preferable.

Of the firing time in the firing process, the retention time at a predetermined temperature, i.e., the firing temperature described above, is not particularly limited, but is preferably 2 hours or longer and more preferably 4 hours or longer. This is because the retention time at the firing temperature is 2 hours or longer, which sufficiently promotes the formation of the cathode active material and more reliably prevents the residual unreacted material.

Although the upper limit of the retention time at the firing temperature is not particularly limited, it is preferable that the maximum retention time be 24 hours or shorter in consideration of productivity, etc.

Although the atmosphere during firing is not particularly limited, it is preferable that the atmosphere be an oxidizing atmosphere. As an oxidizing atmosphere, an oxygen-containing gas atmosphere may be preferably used, and more preferably, for example, an atmosphere having an oxygen concentration of 18% by volume or higher to 100% by volume or lower.

This is because the concentration of oxygen in the atmosphere at the time of firing is 18% by volume or higher, and thus the crystallinity of the cathode active material may be particularly enhanced.

When the atmosphere is the oxygen-containing gas atmosphere, for example, the air, oxygen, a gas mixture of oxygen and an inert gas, or the like may be used as the gas constituting the atmosphere.

It is preferable that the oxygen concentration in the mixture gas satisfy the above range when the gas constituting the oxygen-containing gas atmosphere, for example, a mixture of oxygen and an inert gas as described above, is used.

In particular, the firing process is preferably carried out in an oxygen-containing gas flow, and more preferably in the atmosphere or in the oxygen flow. In particular, in view of the battery property, it is preferable to perform in an oxygen flow.

The furnace used for firing is not particularly limited, and it may be possible to fire a mixture in an oxygen-containing gas atmosphere. However, from the viewpoint of maintaining the atmosphere in the furnace uniformly, an electric furnace without gas generation is preferable, and either a batch type or a continuous type furnace may be used.

The cathode active material obtained by the firing process may have aggregation or slight sintering. In this case, it is permissible to crush.

In this case, the crushing is an operation in which mechanical energy is injected into the aggregation composed of multiple secondary particles produced by sintering necking between secondary particles during sintering, etc., and the secondary particles are mutually separated without destroying the secondary particles themselves, and the aggregation is loosened.

Further, it is preferable to perform calcination before the firing process.

When the calcination is performed, the calcination temperature may be lower than the firing temperature in the firing process, although not particularly limited. The calcination temperature is preferably, for example, between 250° C. or higher and 600° C. or lower, and more preferably between 350° C. or higher and 550° C. or lower.

It is preferable that the calcination time, i.e., the retention time at the calcination temperature, be, for example, 1 hour or longer to 10 hours or shorter, and more preferably 3 hours or longer to 6 hours or shorter.

After the calcination, it may be cooled and subjected to the firing process. However, the firing process may be carried out while the temperature is continuously increased from the calcination temperature to the firing temperature.

Although the atmosphere when performing the calcination is not particularly limited, the atmosphere may be similar to, for example, that of the firing process.

By performing the calcination, lithium diffusion to the cathode active material precursor is sufficiently carried out to obtain, in particular, a uniform cathode active material.

The method for manufacturing the cathode active material of this embodiment may further include an arbitrary process.

For example, a water washing process may be performed to remove excess lithium compounds attached to the surface of the resulting cathode active material.

In the water washing process, for example, the cathode active material obtained in the firing process may be charged into pure water to form a slurry, and after stirring for a predetermined period of time, it may be separated from water, filtered, and dried.

According to the method for manufacturing the cathode active material according to the present embodiment, because the cathode active material precursor described above is used, it is possible to easily and uniformly mix the cathode active material precursor and the lithium compound in the mixing process, and to prevent the mixture from separating during the firing process. For this reason, the cathode active material having the uniform composition and the desired composition may be stably manufactured. That is, according to the method for manufacturing the cathode active material according to the present embodiment, for example, when the mass ratio (Li/Me ratio) of lithium to metals other than lithium is measured at multiple locations, a cathode active material having reduced variation may be obtained.

(Non-Aqueous Electrolyte Secondary Battery)

Next, an example of a configuration of a non-aqueous electrolyte secondary battery according to this embodiment will be described.

The non-aqueous electrolyte secondary battery of this embodiment can have a cathode using a cathode active material manufactured using the aforementioned cathode active material precursor as the cathode material.

First, a structural example of the non-aqueous electrolyte secondary battery according to this embodiment will be described.

The non-aqueous electrolyte secondary battery of this embodiment can have a configuration substantially similar to that of an ordinary non-aqueous electrolyte secondary battery, except that the cathode active material is used as the cathode material precursor as described above.

Specifically, the non-aqueous electrolyte secondary battery of this embodiment may have a casing and a configuration including a cathode, an anode, a non-aqueous electrolyte solution, and a separator contained in the casing.

More specifically, the cathode and the anode may be laminated via a separator to form an electrode body, and the resulting electrode body may be impregnated with the non-aqueous electrolyte. A cathode current collector of the cathode is connected to a cathode terminal passing through the outside, and an anode current collector of the anode is connected to an anode terminal passing through the outside, respectively, using a current collecting lead or the like, so that the configuration is hermetically enclosed in the casing.

Needless to say that the configuration of the non-aqueous electrolyte secondary battery according to the present embodiment is not limited to the above example, and various shapes such as the outer shape, the cylindrical shape, the laminated shape, and the like may be employed.

An example of the configuration of each member will be described below.

(Cathode)

First, the cathode will be described.

The cathode is a sheet-like part, for example, a cathode mixture paste containing the cathode active material produced using the cathode active material precursor described above may be formed by applying it to the surface of an aluminum foil current collector and drying it. The cathode is appropriately processed in conformity with the battery to be used. For example, a cutting process may be performed to form an appropriate size in conformity with the cell of interest, and a compression process may be performed by means of a roll press or the like to increase the electrode density.

The above cathode mixture paste may be formed by adding a solvent to the cathode mixture and kneading it. The cathode mixture may be formed by mixing the cathode active material manufactured using the above cathode active material precursor, which is in the form of a powder, with the conductive material, and the binder.

The conductive material is added to provide appropriate conductivity to the electrode. Although the materials for the conductive material may not be specifically limited, graphite such as natural graphite, artificial graphite, and expanded graphite, and carbon black materials such as acetylene black and Ketjen black are usable.

The binder serves to anchor the cathode active material. The binder used in such a cathode material is not particularly limited, but one or more selected from, for example, polyvinylidene fluoride (PVDF), polytetrafluoroethylene (PTFE), fluoroethylene rubber, ethylene propylene diene rubber, styrene butadiene, cellulosic resins, polyacrylic acids, and the like may be used.

Further, activated carbon or the like may be added to the cathode mixture. By adding activated carbon or the like to the cathode mixture, the electric double layer capacity of the cathode may be increased.

The solvent serves to dissolve the binder and disperse the cathode active material, the conductive material, the activated carbon, and so on in the binder. The solvent is not particularly limited, but an organic solvent such as, for example, N-methyl-2-pyrrolidone may be used.

Also, the mixing ratio of each material in the cathode mixture paste is not particularly limited, and may be similar to that in the cathode of the general non-aqueous electrolyte secondary battery, for example. For example, when the solid content of the cathode mixture excluding the solvent is 100 mass parts, the content of the cathode active material may be 60 mass parts or higher and 95 mass parts or lower, the content of the conductive material may be 1 mass part or higher and 20 mass parts or lower, and the content of the binder may be 1 mass part or higher and 20 mass parts or lower.

(Anode)

The anode is a sheet-like part formed by applying an anode alloy paste to a surface of a metal foil current collector, such as copper, and drying.

The anode is formed in a substantially similar manner to the cathode described above, although the components of the anode mixture paste, the composition thereof, and the materials of the current collector are different, and various processes are performed as necessary in a manner similar to the cathode.

The anode mixture paste may be pasted with a suitable solvent in the anode mixture obtained by mixing the anode active material and the binder.

For example, a material containing lithium, such as a metal lithium or a lithium alloy, or an inserting material capable of inserting and de-inserting lithium ions may be employed as an anode active material.

The inserting material may be, but is not limited to, one or more selected from, for example, organic compound firing bodies such as natural graphite, artificial graphite, phenolic resins, and powders of carbon materials such as coke.

When the inserting material is used as the anode active material, a fluorinated resin such as PVDF may be used as the binder, and an organic solvent such as N-methyl-2-pyrrolidone may be used as the solvent for dispersing the anode active material in the binder.

(Separator)

The separator is disposed between the cathode and the anode, and has a function of separating the cathode and the anode and holding the electrolyte solution.

The separator material may be a thin film such as, for example, polyethylene or polypropylene, having a number of fine pores. However, if the separator has the above function, the separator material is not particularly limited.

(Non-Aqueous Electrolyte)

The non-aqueous electrolyte is a solution in which the lithium salt as the supporting salt is dissolved in the organic solvent.

The organic solvent may be a cyclic carbonate such as ethylene carbonate, propylene carbonate, butylene carbonate, trifluoropropylene carbonate; a chain carbonate such as diethyl carbonate, dimethyl carbonate, ethylmethyl carbonate, dipropyl carbonate; an ether compound such as tetrahydrofuran, 2-methyltetrahydrofuran, dimethoxyethane; a sulfur compound such as ethylmethylsulfone or butanesulfone; or a phosphorous compound such as triethyl phosphate or trioctyl phosphate, or the like, used alone or in combination with two or greater species.

The support salts may include $LiPF_6$, $LiBF_4$, $LiClO_4$, $LiAsF_6$, $LiN(CF_3SO_2)_2$, and combinations thereof.

The non-aqueous electrolyte may include a radical scavenger, a surfactant, a flame retardant, or the like for improving the battery property.

EXAMPLE

Hereinafter, the present invention will be described in more detail with reference to embodiments. However, the present invention is not limited to the following examples.

Example 1

(Production of Cathode Active Material Precursor)

The crystallization process is performed according to the following procedure to produce $Ni_{0.88}Co_{0.12}(OH)_2$ as the cathode active material precursor.

Figure 2:
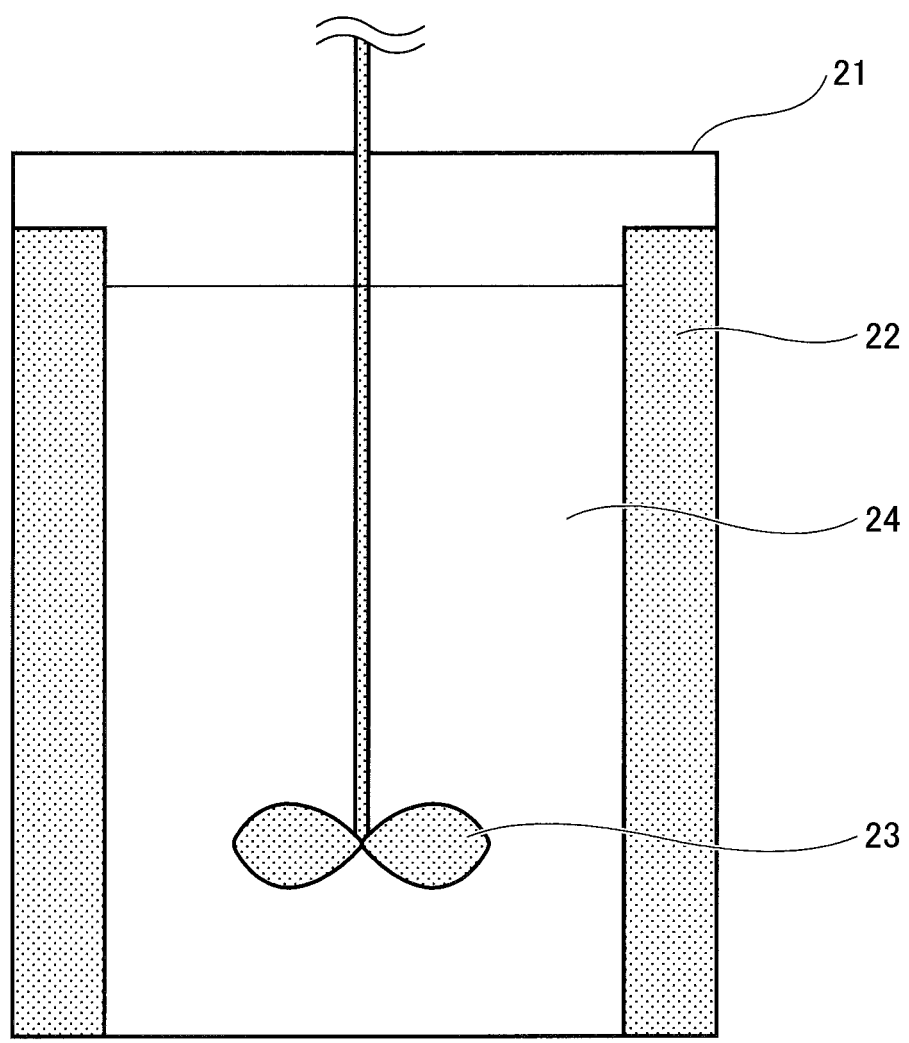
FIG. 2 is a schematic cross-sectional view of the crystallization apparatus used in Example 1 in accordance with the present invention.

FIG. 2 is a schematic cross-sectional view in a plane parallel to the central axis through the central axis of the crystallization apparatus used in the crystallization process. As illustrated in FIG. 2, a reaction vessel (a stirring tank) 21 having the inside in a cylindrical shape is prepared as the crystallization apparatus 20. Four baffle plates 22 are fixed to the inner wall of the reaction vessel 21.

In the reaction vessel 21, the stirring blade 23 with six blades is provided so that the initial aqueous solution or reaction solution 24 in the reaction vessel 21 may be stirred by the stirring blade 23. Further, the reaction vessel 21 is provided with an overflow port (not illustrated) that is configured to recover the cathode active material produced by continuously overflowing.

When the preliminary test was performed, it was confirmed to be preferable that a sufficient stirring force was applied to the reaction solution when the product of the baffle plate condition represented by the following formula (1) and the stirring rotation rate is 35 or greater to 100 or smaller, and the flow factor of the resulting cathode active material precursor may be set to a desired range.

(Baffle plate condition)=$(B/Dr)^{1.2} \times n_B$ (1), where B: width (m) of the baffle plate; Dr: inner diameter (m) of the reaction vessel; and $n_B$: number of baffle plates (sheets). Accordingly, in the present embodiment, the reaction vessel and the stirring condition were set so that the product of the baffle plate condition and the stirring speed is 46.8.

Then, pure water whose volume was 6500 L was put into the reaction vessel 21 to a volume of 6500 L, and the temperature in the reaction vessel was set to 49° C. The temperature of the initial aqueous solution and the reaction solution was kept at 49° C. until the crystallization process was complete.

The ammonia water of 25 wt % as the aqueous solution (b) containing an ammonium ion supplier was added to the water in the reaction vessel 21 so that the initial aqueous solution had an ammonium ion concentration of 15.5 g/L.

Further, the aqueous sodium hydroxide solution of 24 wt % as the caustic aqueous alkaline solution (c) was added to the water in the reaction vessel 21, and the pH was adjusted to 11.4 based on 50° C., whereby the initial aqueous solution was obtained.

Then, while stirring the initial aqueous solution, the mixed aqueous solution (a) containing the nickel salt and cobalt salt, the aqueous solution (b) containing the ammonium ion supplier, and the caustic aqueous alkaline solution (c) were continuously fed into the solution of the initial aqueous solution to form the reaction solution, and the crystallization of the cathode active material was carried out.

A mixed aqueous solution (a) containing the nickel salt and the cobalt salt used contains nickel sulfate as the nickel salt and the cobalt sulfate as the cobalt salt. Each metal salt was then added and mixed so that the ratio of the amount of nickel to cobalt in the mixed aqueous solution (a) was 88:12 and the metal salt concentration was 2.1 mol/L.

As the aqueous solution (b) containing the ammonium ion supplier and the caustic aqueous solution (c), the same aqueous solution as used in preparing the initial aqueous solution was used.

During the crystallization process, the mixed aqueous solution (a) containing the nickel salt and the cobalt salt was fed to the initial aqueous solution and the reaction solution at a feed rate of 11.32 L/min, the aqueous solution (b) containing the ammonium ion feed rate of 1.56 L/min, and the caustic aqueous solution (c) was fed to the initial aqueous solution at a feed rate of 7.35 L/min.

During the crystallization process, it was confirmed that the reaction solution was kept at a temperature of 49° C., a pH of 11.1 or higher to 11.7 or lower at 50° C., and an ammonia concentration of 15.5 g/L.

The recovered crystallites were washed with water, filtered, and dried to afford a complex metal hydroxide, which was the cathode active material precursors.

For the resulting cathode active material precursor, a single-plane shear test was performed according to ASTM D6128 by Powder Flow Tester (manufactured by Brookfield, AMETEK. Inc.) to determine the maximum consolidation stress and uniaxial decay stress. From the result obtained, the flow factor, which is the ratio of the maximum consolidation stress to the single-axis decay stress (maximum consolidation stress/single-axis decay stress), was determined to be 15.9. The measurement method of the maximum consolidation stress and the single-axis decay stress has been described previously using FIGS. 1A and 1B. Therefore, the description is omitted here.

Further, when the internal friction angle was measured by the powder flow tester described above, it was confirmed that the internal friction angle was 31°. The measurement condition was as follows: a blade-type lid was used as a pusher, with a vertical travel speed of 1.0 mm/second and a rotation speed of 1 turn/hour.

The resulting cathode active material precursor was roasted in an air flow (oxygen: 21% by volume) at 700° C. for 6 hours to thoroughly form the complex metal oxide (roasting process), which was thereafter subjected to the process of manufacturing the cathode active material. When the flow factor and the internal friction angle were measured for the complex metal oxide obtained after the roasting process as in the case of the cathode active material precursor, the flow factor was 10.5 and the internal friction angle was 30°.

(Production of Cathode Active Material)

A mixture of a lithium compound and a complex metal oxide obtained after the roasting process described above was prepared (mixing process) according to the following procedure.

As the lithium compound, lithium hydroxide monohydrate (LiOH·H2O) was subjected to anhydrous treatment by vacuum drying, and the resulting lithium anhydride was used. The obtained anhydrous lithium hydroxide was subjected to the milling process and subjected to the following mixing process after an average particle size is rendered 79.93 μm at a cumulative value of 50% in the particle size distribution determined by the D50 (median diameter based on volume), namely a laser diffraction/scattering method.

In the mixing process, the mixture was prepared by weighing the lithium compound and the complex metal oxide so that the ratio of the number of atoms in the mixture was Li/Me 1.035.

The mixture obtained in the mixing process was loaded into a firing vessel with an inner dimension of 280 mm(L)× 280 mm(W)×90 mm(H), which was then fired using a continuous firing furnace, Roller Hearth Kiln, with an oxygen concentration of 80 vol % and the rest in an inert gas atmosphere at a maximum temperature of 770° C. for 12 hours (firing process). The resulting fired product was charged into pure water to make a slurry so that the mass ratio was 1.5 to water. After stirring for 30 minutes, the slurry was filtered and dried to obtain the cathode active material (water washing process).

The resulting cathode active material was sampled at any 10 locations, and for each sample, the content of each metal was assessed using an ICP luminescence spectroscopic analyzer (Model No. 730-ES manufactured by Agilent Technology, Inc.) to calculate the mass ratio (Li/Me) of lithium and non-lithium metals in each sample. Meanwhile, Me means the total amount of metal other than Li, which is the sum of Ni and Co.

The results showed that the variation in Li/Me between samples was within ±0.15%.

The manufacturing conditions for the cathode active material precursor and the evaluation results for the cathode active material precursor, complex metal oxide, and cathode active material are illustrated in Table 1.

Further, the reaction vessel and stirring conditions were set so that the product of the above-described baffle plate condition and the stirring speed is 37.7 (Example 4) or 46.8 (Example 5).

As a lithium compound for the mixing process, the anhydrous lithium hydroxide, whose D50 is the value illustrated in Table 1, was used.

TABLE 1

| | | EX-AMPLE 1 | EX-AMPLE 2 | EX-AMPLE 3 | EX-AMPLE 4 | EX-AMPLE 5 | COMPARATIVE EXAMPLE 1 | COMPARATIVE EXAMPLE 2 |
|---|---|---|---|---|---|---|---|---|
| CONDITION FOR CRYSTALLIZATION PROCESS | BAFFLE PLATE CONDITION | 0.26 | 0.34 | 0.26 | 0.26 | 0.26 | 0.26 | 0.31 |
| | NUMBER OF STIRRING ROTATION (rpm) | 180 | 120 | 145 | 145 | 180 | 120 | 420 |
| | BAFFLE PLATE CONDITION × NUMBER OF STIRRING ROTATION | 46.8 | 40.8 | 37.7 | 37.7 | 46.8 | 31.2 | 130.2 |
| CATHODE ACTIVE MATERIAL PRECURSOR POWDER CHARACTERISTIC | FLOW FACTOR | 15.9 | 17.4 | 13.8 | 13.4 | 16.4 | 9.9 | 22.4 |
| | INTERNAL FRICTION ANGLE (°) | 31 | 30 | 31 | 30 | 30 | 32 | 28 |
| COMPLEX METAL OXIDE POWDER CHARACTERISTIC | FLOW FACTOR | 10.5 | 10.3 | 9.1 | 12.1 | 12.8 | 7.7 | 15.1 |
| | INTERNAL FRICTION ANGLE (°) | 30 | 30 | 31 | 31 | 31 | 32 | 29 |
| LITHIUM COMPOUND | D50 (μm) | 79.93 | 82.02 | 81.95 | 86.84 | 99.22 | 87.53 | 82.58 |
| MIXTURE EVALUATION | Li/Me RATIO VARIATION | ±0.15% | ±0.10% | ±0.10% | ±0.10% | ±0.10% | ±0.25% | ±0.25% |

Examples 2, 3

In manufacturing the cathode active material precursor, the reaction vessel and stirring conditions were set so that the product of the above-described baffle plate conditions and the stirring rotation rate is 40.8 (Example 2) or 37.7 (Example 3) in the crystallization process.

Further, as a lithium compound for the mixing process, lithium anhydride, in which D50 is the value illustrated in Table 1, was used.

With the exception of the above points, the cathode active material precursor, complex metal oxide, and cathode active material were prepared in a manner similar to that in Example 1.

The manufacturing conditions for the cathode active material precursor and the evaluation results for the cathode active material precursor, complex metal oxide, and cathode active material are illustrated in Table 1.

Examples 4 and 5

In preparing the cathode active material precursor, a mixed aqueous solution containing nickel salt, cobalt salt, and aluminum salt was used as the mixed aqueous solution (a) in the crystallization process. Nickel sulfate was used as the nickel salt, cobalt sulfate as the cobalt salt, and aluminum sulfate as the aluminum salt. Then, each metal salt was added and mixed so that the ratio of the amount of nickel in the mixed aqueous solution (a) to the amount of cobalt was 82:15:3 (Example 4), 91:4.5:4.5 (Example 5).

The metal salt concentration of the mixed aqueous solution (a) is the same as that of Example 1.

The cathode active material precursor, complex metal oxide, and cathode active material were prepared in the same manner as Example 1 except for the above points.

As the cathode active material precursor, $Ni_{0.82}Co_{0.15}Al_{0.03}(OH)_2$ was prepared in Example 4 and $Ni_{0.91}Co_{0.045}Al_{0.045}(OH)_2$ in Example 4, respectively.

The manufacturing conditions for the cathode active material precursor and the evaluation results for the cathode active material precursor, the complex metal oxide, and the cathode active material are illustrated in Table 1.

Comparative Examples 1 and 2

In manufacturing the cathode active material precursor, the reaction vessel and stirring conditions were set so that the product of the above-described baffle plate conditions and the stirring speed is 31.2 (Comparative Example 1) or 130.2 (Comparative Example 2) in the crystallization process.

Further, as the lithium compound for the mixing process, lithium anhydride, in which D50 has the values illustrated in Table 1, was used.

With the exception of the above points, the cathode active material precursor, complex metal oxide, and cathode active material were prepared in the same manner as in Example 1.

The manufacturing conditions for the cathode active material precursor and the evaluation results for the cathode active material precursor, complex metal oxide, and cathode active material are illustrated in Table 1.

From the results illustrated in Table 1, it was confirmed that in Examples 1 to 5 using a cathode active material precursor with a flow factor of 10 to 20 or smaller, the variation in the mass ratio (Li/Me ratio variation) between lithium and metal other than lithium in the obtained cathode active material was small. Therefore, it may be said that the cathode active material precursor in Examples 1 to 5 is easy to mix with the lithium compound and is capable of inhibiting the separation of the lithium compound.

In the above embodiment and the comparative example, the cathode active material precursor is roasted and used as a complex metal oxide. However, even when the cathode active material precursor is used without roasting, there is no significant change in the powder characteristics before and after roasting, i.e., the tendency of mixing with the lithium compound. Therefore, it is possible to easily mix with the lithium compound and to prevent separation from the lithium compound.

Although the cathode active material precursor for the non-aqueous electrolyte secondary battery has been described in embodiments and examples, the present invention is not limited to the above-described embodiments and examples. Various variations and modifications are possible within the scope of the invention as set forth in the appended claims.

This application claims a priority under Japanese Patent Application No. 2016-252080 filed with the Japan Patent Office on Dec. 26, 2016, and the entire contents of Patent Application No. 2016-252080 are incorporated herein by reference.

The invention claimed is:

1. A cathode active material precursor for a non-aqueous electrolyte secondary battery that is a complex metal hydroxide having a flow factor of 10 or greater to 20 or smaller.

2. The cathode active material precursor for the non-aqueous electrolyte secondary battery according to claim 1, wherein the internal friction angle is 30° or greater and 32° or smaller.

3. The cathode active material precursor for the non-aqueous electrolyte secondary battery according to claim 1, the cathode active material precursor comprising nickel and cobalt.

4. The cathode active material precursor for the non-aqueous electrolyte secondary battery according to claim 3, the cathode active material precursor further comprising an element M (M is at least one selected from Mg, Al, Ca, Ti, V, Cr, Mn, Zr, Nb, Mo, Sr, and W).

* * * * *